(12) United States Patent
Hermansen et al.

(10) Patent No.: US 9,797,433 B2
(45) Date of Patent: Oct. 24, 2017

(54) REMOTE CONTROL LEVER ASSEMBLY

(71) Applicant: CRANK BROTHERS, INC., Laguna Beach, CA (US)

(72) Inventors: Frank Hermansen, Laguna Beach, CA (US); Carl Winefordner, Laguna Beach, CA (US)

(73) Assignee: CRANK BROTHERS, INC., Laguna Beach, CA (US)

( * ) Notice: Subject to any disclaimer, the term of this patent is extended or adjusted under 35 U.S.C. 154(b) by 89 days.

(21) Appl. No.: 14/755,202

(22) Filed: Jun. 30, 2015

(65) Prior Publication Data
US 2017/0002855 A1   Jan. 5, 2017

(51) Int. Cl.
| | |
|---|---|
| *F16C 1/12* | (2006.01) |
| *B62L 3/02* | (2006.01) |
| *B62M 25/04* | (2006.01) |
| *B62M 25/02* | (2006.01) |
| *B62K 23/06* | (2006.01) |
| *F16C 1/10* | (2006.01) |

(52) U.S. Cl.
CPC .............. *F16C 1/12* (2013.01); *B62K 23/06* (2013.01); *B62L 3/02* (2013.01); *B62M 25/02* (2013.01); *B62M 25/04* (2013.01); *F16C 1/10* (2013.01)

(58) Field of Classification Search
CPC .. F16C 1/18; F16C 1/145; F16C 1/265; F16C 1/262; B62K 23/06; B62L 3/026; B62L 3/02; B62M 25/04; B62M 25/02; B60T 7/102; B60T 11/046; G05G 1/04; G05G 1/06; Y10T 74/20402; Y10T 74/20396; Y10T 74/2028; Y10T 74/20287; Y10T 74/20822
See application file for complete search history.

(56) References Cited

U.S. PATENT DOCUMENTS

| | | | | |
|---|---|---|---|---|
| 4,726,252 A | * | 2/1988 | Dawson ................. | B62K 23/06 188/265 |
| 5,247,852 A | * | 9/1993 | Guerr ................... | B62K 21/125 403/88 |
| 6,265,967 B1 | * | 7/2001 | Okada ..................... | B62J 99/00 340/432 |
| 2012/0272777 A1 | * | 11/2012 | Tolhurst ............... | B62K 21/125 74/491 |
| 2014/0139977 A1 | * | 5/2014 | Kosaka ................. | B62K 23/02 361/679.01 |

* cited by examiner

*Primary Examiner* — Daniel D Yabut
(74) *Attorney, Agent, or Firm* — Tutunjian & Bitetto, P.C.

(57) ABSTRACT

A remote control lever assembly suitable to be mounted on bicycle handlebars and the like, including a coupling portion for fixing the assembly to the bicycle handlebar, a lever support, and a lever movably connected to said lever support. The assembly further includes a spherical joint adjustably connecting said lever support to said coupling portion.

15 Claims, 7 Drawing Sheets

REMOTE CONTROL LEVER ASSEMBLY

FIELD OF THE INVENTION

The present invention relates to a remote control lever assembly.

BACKGROUND OF THE INVENTION

Remote control lever assemblies for bicycle adjustable height seat posts typically include a pivoting lever, a body on which the pivoting lever is hinged, a clamp for connecting the body of the assembly to a bicycle handlebar, and a fastener for tightening the clamp to the handlebar.

A flexible cable, operatively connected to the height adjustable seat post, is linked to the pivoting lever; as the lever is moved, the flexible cable is pulled through the body, and activates a valve or mechanism within the seat post.

Typical bicycles that use height adjustable seat posts have right and left brake levers and grips, and a gear shifter on the right and possibly also on the left.

The remote control lever assembly can potentially be mounted in four positions on the handlebar: top right, bottom right, top left, and bottom left.

Most remote control lever assemblies can only be mounted in two positions: top right and bottom left, or bottom right and top left.

However, some remote control lever assemblies can be mounted in all four positions: they typically require some disassembly and reassembly in order to achieve this.

Most riders have personal preferences for where the remote control lever assembly is mounted, based, for example, on their bicycle configuration or on possible physical limitations.

With particular reference to the gear shifters mounted on the bicycle handlebar, it is observed that there are mainly two types of shifters: twist shifters and trigger shifters.

Twist shifters are higher profile than trigger shifters: usually it is desirable, for remote control lever assemblies, to be as low profile as possible.

When a lever assembly is designed for trigger shifters, then normally it will not fit handlebars with twist shifters, unless the assembly is overly high profile.

On the other hand, when a lever assembly is designed for twist shifters, then it will be higher profile than necessary when fitted to handlebars with trigger shifters. Existing remote control lever assembly have very limited position adjustability.

Even if the lever can be placed in all four of the handlebar locations, fine adjustment is very limited. Many lever assemblies are difficult, or impossible, to mount in the desired position, because the fastener that tightens the assembly to the handlebar is not accessible: in particular, the brake lever or shifter mounts obstruct fastener access.

In other cases, the cable exit from the remote lever assembly interferes with the brake lever of shifter mounts, or with cable routing.

One kind of existing remote control lever assembly design is not traditionally hinged, but instead it comprises a joystick-like actuation lever, that can be pushed or pulled in any direction.

This design, however, is not as comfortable to use, because it requires pushing on a round rod rather than a larger pad that better spreads out the load.

In addition, while the lever can be pushed in any direction, it often has certain directions where it collides with the shifters, grips, or mounting hardware.

It should also be noted that many people do not like the "feel" of the motion of this kind of lever assembly. Also, this design has the same lack of adjustability as many of the hinged lever designs.

Another existing remote control lever assembly design is suitable for pushing ad hydraulic fluid rather than pulling a cable. However, the same adjustable position limitations occurs as cable pull levers.

SUMMARY OF THE INVENTION

The technical aim of the present invention is therefore to improve the state of the art.

Within such technical aim, it is an object of the invention to develop a remote control lever assembly that can be effectively mounted on the handlebar in any desired position of the latter.

Another object of the present invention is to devise a remote control lever assembly in which the mounting position on the handlebar can be finely adjusted in order to avoid collisions or interferences with other functional parts like brake levers, shifters, and/or the respective cables.

A further object of the invention is to develop a remote control lever assembly that can be indifferently actuated by thumb pushing or finger pulling, depending on the choice of the user.

Still another object of the invention is to devise a remote control lever assembly which allows to achieve the foregoing objects with a simple and economic solution.

This aim and these objects are all achieved by a remote control lever assembly, suitable to be mounted on bicycle handlebars and the like, comprising a coupling portion for fixing the assembly to the bicycle handlebar, a lever support, and a lever movably connected to the lever support; the assembly further comprises a spherical joint, adjustably connecting said lever support to said coupling portion.

The spherical joint allows an extensive angular and rotational fine position adjustment of the lever support with respect to the coupling portion.

More in detail, the spherical joint comprises a spherical housing connected to the coupling portion, and a spherical protrusion of the lever support adjustably engaging the spherical housing.

The coupling portion comprises a first clamp, and the assembly further comprises a second clamp, connected to the first claim, in which the spherical housing is defined.

A clamp fastener is foreseen suitable to simultaneously fix the first clamp to the handlebar and the second clamp to the spherical protrusion.

In an embodiment of the invention, the assembly further comprises an actuation cable, connected to the lever; the lever support comprises a first passing channel of the spherical housing, through which the actuation cable passes; the lever comprises a second passing channel, through which the actuation cable passes.

Thanks to the extensive angular and rotational fine position adjustment of the lever support, the actuation cable won't interfere with shifters and brake levers mounted on the handlebar.

According to a further aspect of the invention, the lever comprises a cable set screw suitable to bend the end of the actuation cable towards the back of the lever itself, preventing the cable end to interfere with user's fingers while actuating the lever.

BRIEF DESCRIPTION OF THE DRAWINGS

These and other advantages will be better understood by any person skilled in the art from the following description that follows and from the attached drawings, given as a non-limiting example, in which.

DETAILED DESCRIPTION OF THE INVENTION

Figure 1:
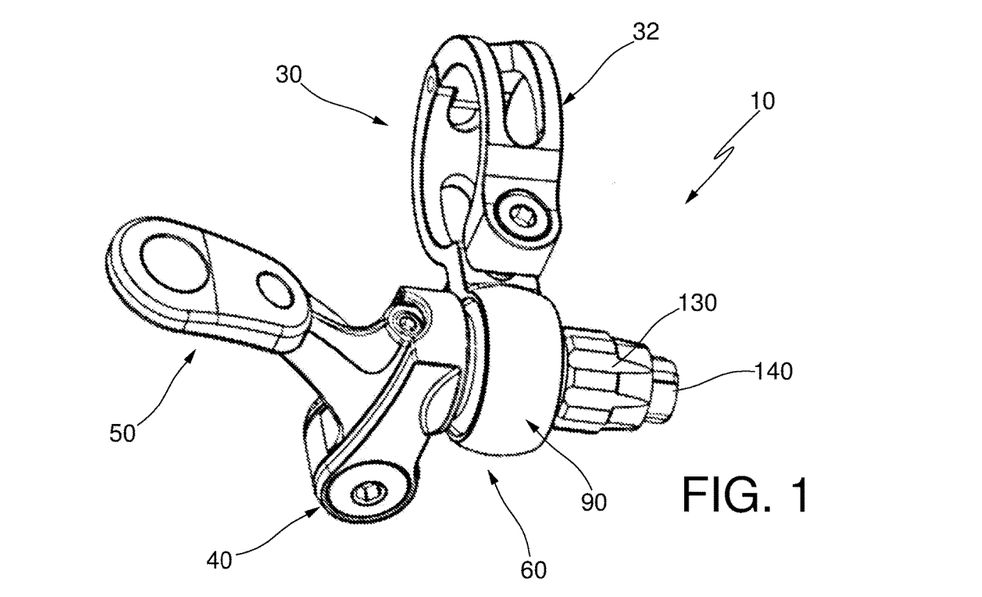
FIG. 1 is a perspective view of a remote control lever assembly according to the invention.
Figure 2:
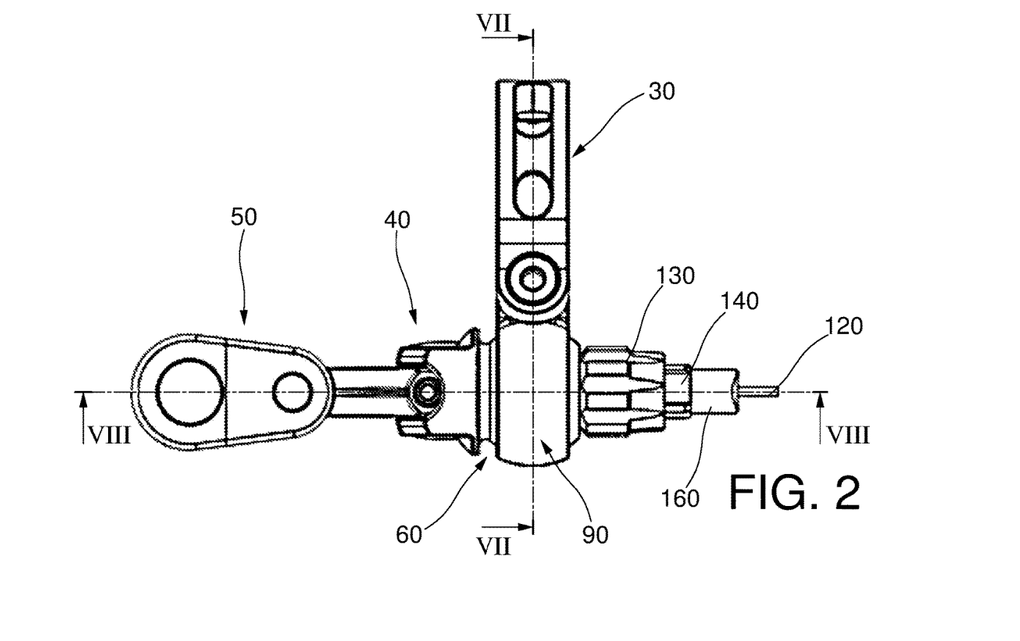
FIG. 2 is a top view of the lever assembly.
Figure 3:
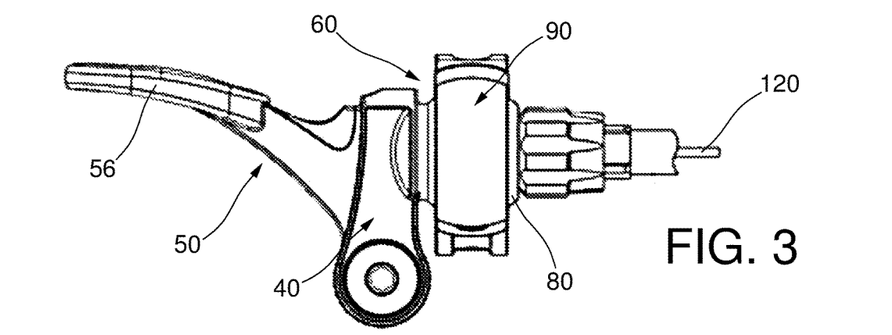
FIG. 3 is a front view of the lever assembly.
Figure 4:
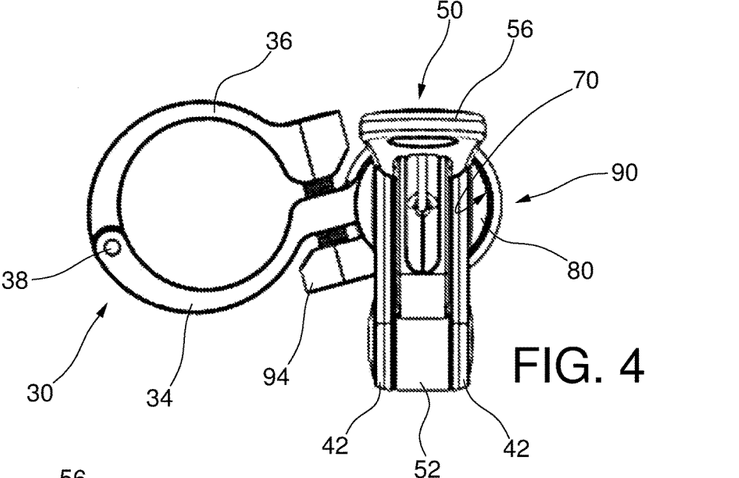
FIG. 4 is left side view of the lever assembly.
Figure 5:
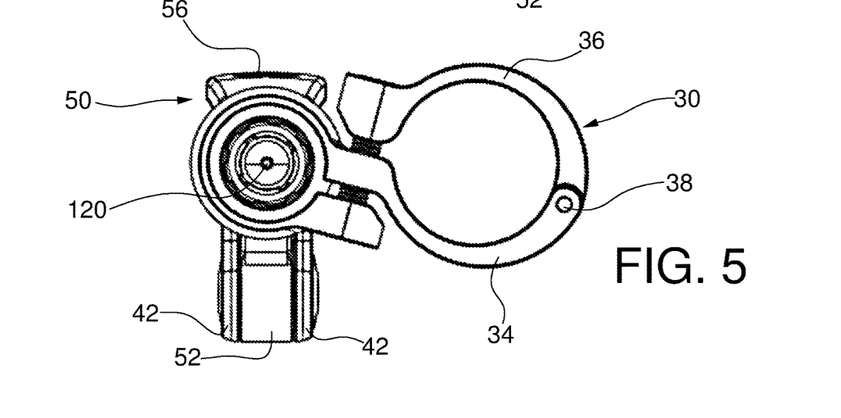
FIG. 5 is a right side view of the lever assembly.
Figure 6:
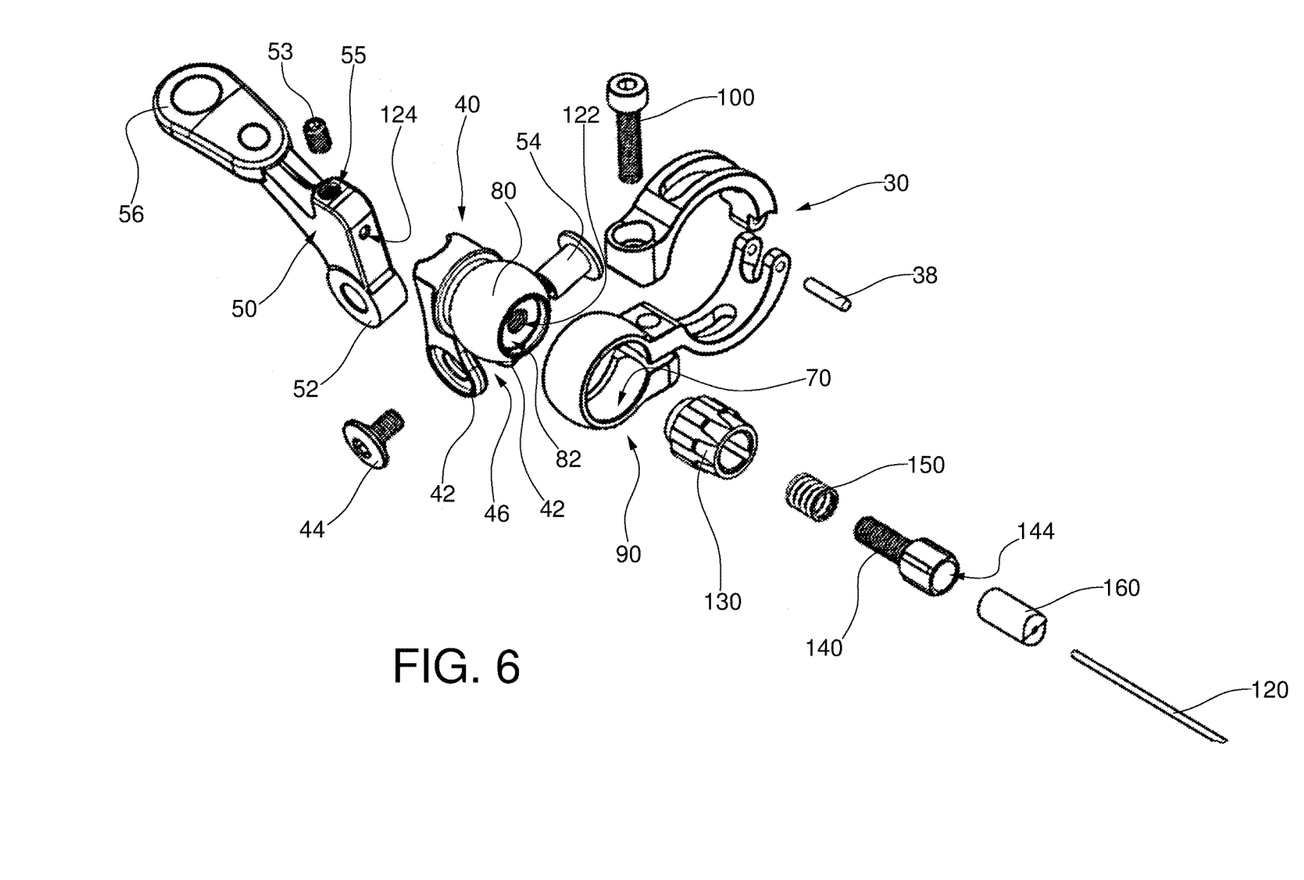
FIG. 6 is an exploded view of the lever assembly.

With reference to FIG. 1, a remote control lever assembly according to the invention is wholly indicated with 10.

In the embodiment disclosed hereafter individual characteristics, given in connection with such specific embodiment, may actually be interchanged with other different characteristics that exist in other embodiments.

The remote control lever assembly 10 according to the invention is of the kind suitable for actuating, for example, an adjustable height seat post, or any other device, installed on the bicycle, which needs a control operable by a lever, or the like.

More in detail, the assembly 10 according to the invention is suitable to be mounted on a bicycle handlebar 20, or the like.

The assembly 10 comprises a coupling portion, wholly indicated with 30, for fixing the assembly 10 itself on the handlebar 20.

The assembly 10 further comprises a lever support 40, and a lever 50 movably connected to the lever support 40.

According to an aspect of the invention, the assembly 10 comprises a spherical joint, wholly indicated with 60, adjustably connecting the lever support 40 to the coupling portion 30.

As it will become apparent below the spherical joint 60, foreseen between the coupling portion 30 and the lever support 40, offers the user the ability to orient the lever support 40—and therefore the lever 50—in the desired position in order not to interfere to other means mounted on the handlebar 20, and in order to achieve the best position for the operation of the lever 50, as preferred by the user. More in detail, the spherical joint 60 comprises a spherical housing 70.

The spherical housing 70 is connected to the coupling portion 30.

The spherical joint 60 further comprises a spherical protrusion 80 of the lever support 40.

The spherical protrusion 80 adjustably engages the spheril housing 70.

The coupling portion 30 comprises a first clamp 32.

The first clamp 32 includes a first clamp member 34 and a second clamp member 36, hinged in a pivot 38.

The first clamp member 34 and the second clamp member 36 are both substantially C-shaped.

The first clamp member 34 and the second clamp member 36 have dimensions and shape such as to fit the external surface of different handlebars 20, having possibly various cross-sections.

According to another aspect of the invention, the assembly 10 comprises a second clamp, wholly indicated with 90.

The second clamp 90 is connected to the first clamp 32. The above cited spherical housing 70 is defined in the second clamp 90: in particular, the spherical housing 70 is defined in the inner surface of the second clamp 90.

The second clamp 90 is substantially in form of a C-bent strip, and its inner surface is spherically conformed. The spherical housing 70 defined in the second clamp 90 has substantially the same radius of the spherical protrusion 80.

The second clamp 90 comprises a first terminal portion 92 and a second terminal portion 94 which are opposite each other.

Figure 7:
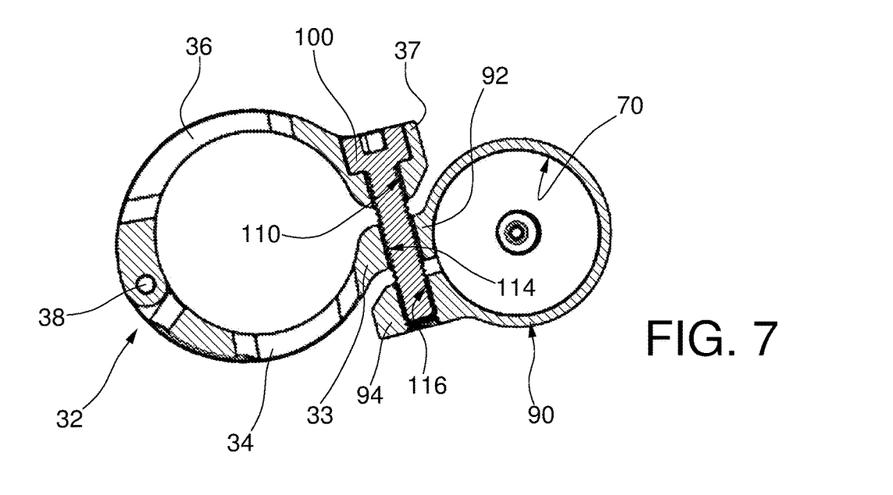
FIG. 7 is a section view of the lever assembly taken on plane VII-VII of FIG. 2.

According to a preferred embodiment of the invention, and with particular reference to FIG. 7, the first terminal portion 92 of the second clamp 90 is integral to the free extremity 33 of the first clamp member 34.

In this way, the first clamp 32 and the second clamp 90 have respective openings substantially facing each other with respect to the clamp fastener 100, allowing to obtain the advantages referred to below.

The assembly 10 comprises a clamp fastener 100.

According to a further aspect of the invention, the clamp fastener 100 is suitable to simultaneously fix the first clamp 90 to the handlebar 20, and the second clamp 32 to the spherical protrusion 80.

In other words, acting on a single clamp fastener 100, the user can perform, in a single operation the locking of the whole assembly 10 with respect to the handlebar 20, and the locking of the spherical protrusion 80 inside the spherical housing 70, as better explained hereafter.

In an embodiment of the invention, the clamp fastener 100 comprises a clamp screw, engaged in a common hole 110 passing through the first clamp 32 and the second clamp 90. More in detail, the common hole 110 comprises a smooth portion 112 passing through the free end 37 of the second clamp member 36.

Moreover, the common hole 110 comprises a hole 114 and a threaded portion 116.

The hole 114 is passing through the first terminal portion 92 of the second clamp 90 (linked to the free extremity 33 of the first clamp member 34).

The threaded portion 116 is passing through the second terminal portion 94 of the second clamp 90.

It is now evident that as the user tightens the clamp fastener 100, the first terminal portion 92 approaches the free end 37, and simultaneously the second terminal portion 94 approaches the first terminal portion 92, and both the first clamp 32 and the second clamp 90 are firmly secured. In a preferred embodiment of the invention, the lever 50 is hinged to the lever support 40.

More in detail, the lever support 40 and the lever 50 include respective linkage portions 42,52, connected by hinge fasteners 44,54.

The linkage portions 42 of the lever support 40 are shaped like identical opposite appendages defining a seat 46 between them, in which the linkage portion 52 of the lever 50 engages.

The lever 50 comprises an actuating end 56.

The actuating end 56 is suitable for operating the lever 50.

The remote control lever assembly 10 comprises an actuation cable 120, connected to the lever 50.

The lever support 40 comprises a first passing channel 122 foreseen in the spherical protrusion 80, through which the actuation cable passes 120.

The axis of the first passing channel 122 coincides with the symmetry axis of the spherical protrusion 80. The first passing channel 122 is at least partially, or totally, threaded.

The lever 50 comprises a second passing channel 124, through which the actuation cable 120 passes.

When the lever 50 is in its inactive position (see for example FIG. 9), the second passing channel 124 is coaxial, or substantially coaxial, to the first passing channel 122.

The lever 50 comprises a recess 51, foreseen in its back.

The second passing channel 124 intercepts the recess 51.

The lever 50 further comprises a cable set screw 53.

The cable set screw 53 is suitable to bend the end 121 of the actuation cable 120 towards the back of the lever 50. As it will become clearer below, thanks to this solution, the end 121 of the actuation cable 120 is safely out of the way to prevent inadvertent contact with fingers.

The cable set screw 53 is engaged in a threaded hole 55 intercepting the second passing channel 124.

Figure 8:
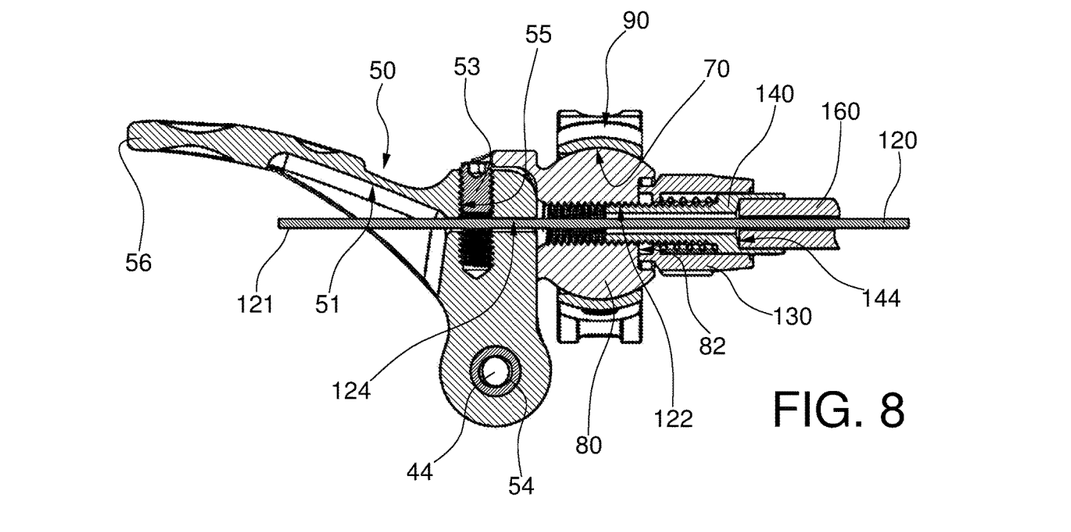
FIG. 8 is a section view of the lever assembly taken on plane VIII-VIII of FIG. 2, during actuation cable tightening.

Reference is now made to FIG. 8, which shows a section of the assembly 10 before the actuation cable 120 has been tightened into position by the cable set screw 53. The actuation cable 120 is straight before tightening the cable set screw 53 in the threaded hole 55.

Figure 9:
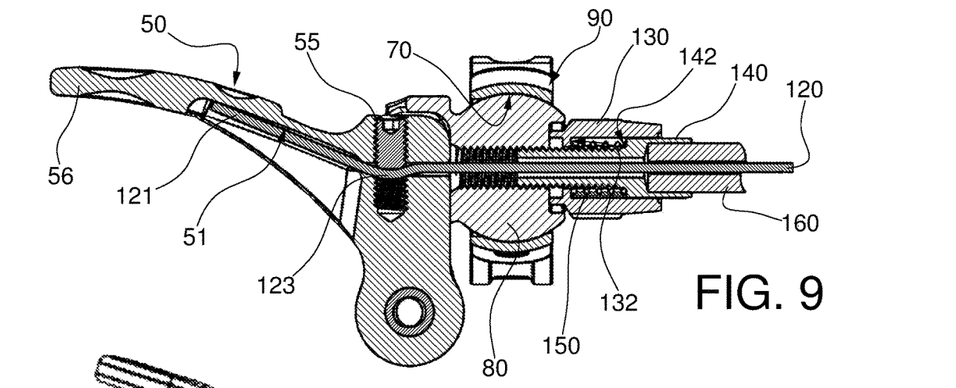
FIG. 9 is a section view of the lever assembly taken on plane VIII-VIII of FIG. 2, after actuation cable is tightened.
Figure 10:
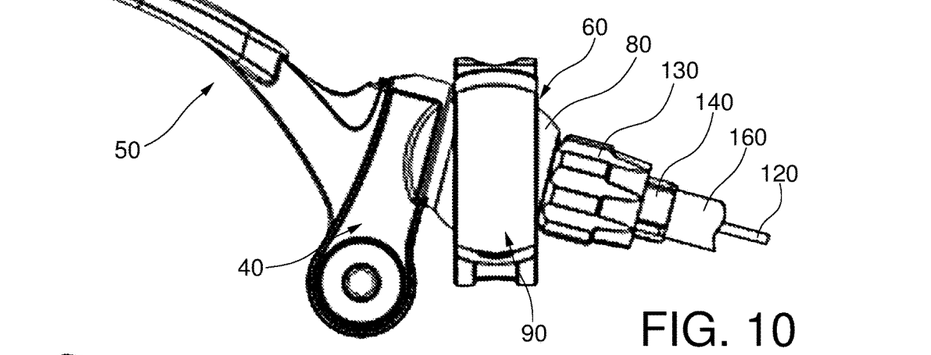
FIG. 10 is a front view of the lever assembly, with the lever placed in a certain position, set by the user, relative to the coupling portion of the assembly.

FIG. 9 shows a section of the assembly 10 after actuation cable 120 has been tightened into position by the cable set screw 53.

Tightening the cable set screw 53 secures the actuation cable 120 to the lever 50, and at the same time it automatically bends the actuation cable 120 into a curve 123 which spring loads the end 121 of the actuation cable 120 against the backside of the lever 50: in particular, the end 121 of the actuation cable 120 engages the recess 51 of the lever 50.

This allows, as stated before, actuating the lever 50 from both sides, since cable end 121 won't interfere with user's fingers movements.

The spherical protrusion 80 comprises a recessed seat 82 for the engagement of an adjustable barrel 130 for the fine tuning of the relative actuation cable 120 length between the assembly 10 and the device actuated by the lever 50, for example the height adjustable seat post (not shown in the figures).

The adjustable barrel 130 is slidably coupled to an adjustable screw 140, through which the actuation cable 120 passes.

The adjustable screw 140 has a threaded portion engaged in the first passing channel 122 of the spherical protrusion 80, as shown for example in FIG. 9.

A compression spring 150 is trapped between rest surfaces 132,142 respectively of the adjustable barrel 130 and of the adjustable screw 140.

The compression spring 150 keeps the adjustable barrel 130 permanently engaged in the recessed seat 82.

The adjustable screw 140 comprises a front seat 144 engaging the cable housing 160.

In FIGS. 1-9 the assembly 10 according to the invention is shown in a configuration in which the axis of the spherical protrusion 80 is substantially parallel to the axis of the first clamp 32.

FIGS. 10 through 14 show some of the adjustments possible because of relative movement of the spherical protrusion 80 within the spherical housing 70.

Figure 11:
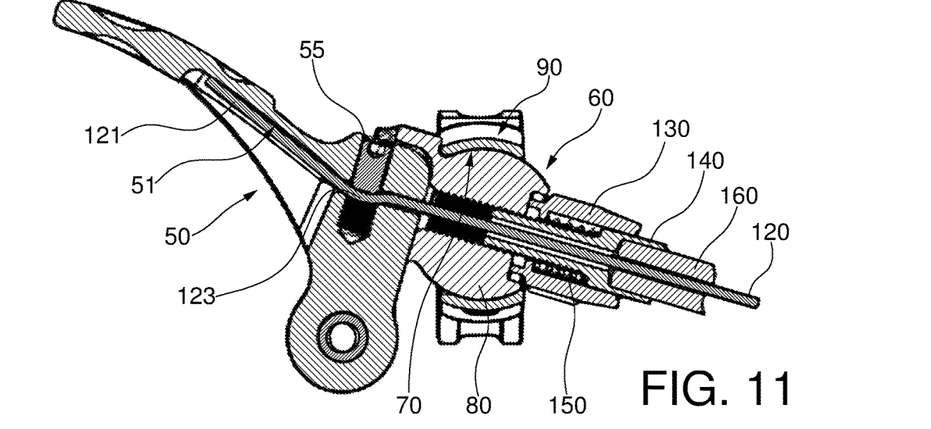
FIG. 11 is a section view of the lever assembly taken on plane VIII-VIII of FIG. 2, when the lever is positioned as shown in FIG. 10.
Figure 12:
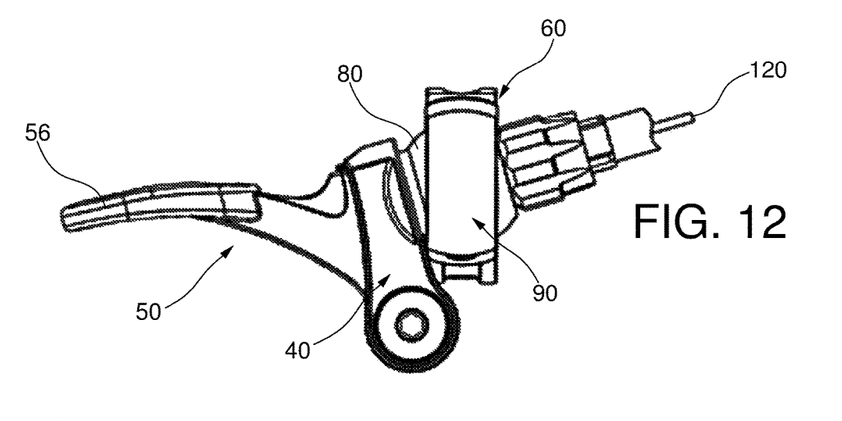
FIGS. 12-14 are respective front views of the lever assembly, with the lever placed in further different positions, set by the user, relative to the coupling portion of the assembly.

As shown in particular in FIG. 11, the inclination of the lever support 40, even at maximum angle with respect to the first clamp 32, does not affect in any way the operation of the lever 50.

Figure 13:
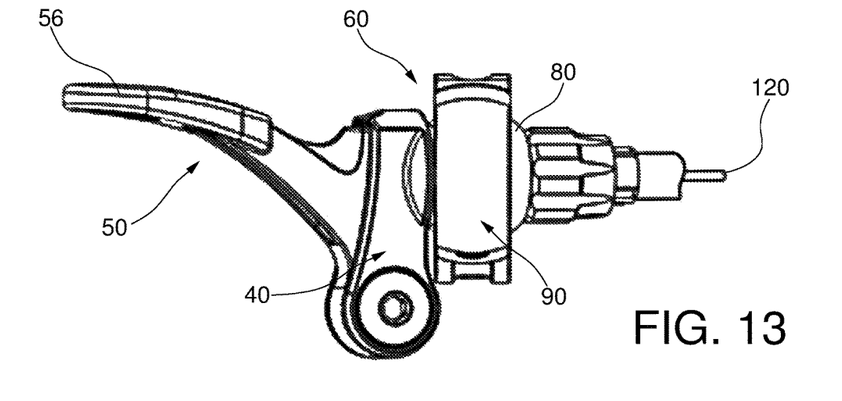
Figure 14:
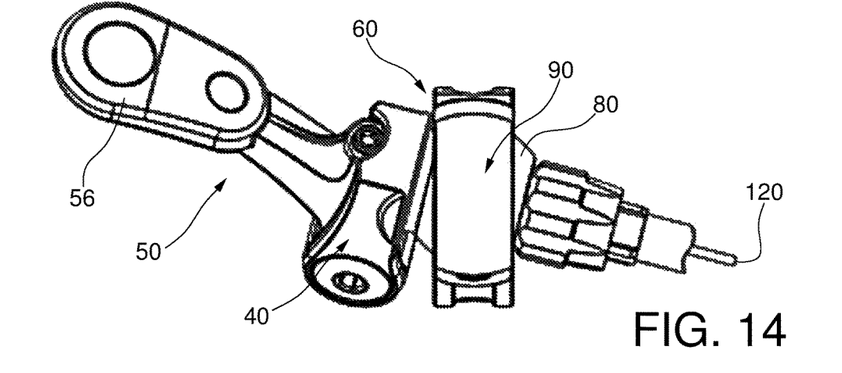

FIGS. 13 and 14 show that the lever support 40 can be actually inclined in any plane with respect to the first clamp 32.

According to this novel feature the invention, the user can place the lever 50 in the most comfortable position, in order to have easy access to the lever 50 itself while riding.

FIGS. 15 through 19 show various mounting options of the assembly 10 according to the invention on the bicycle handlebar 20.

Figures 15, 16, 17, 18:
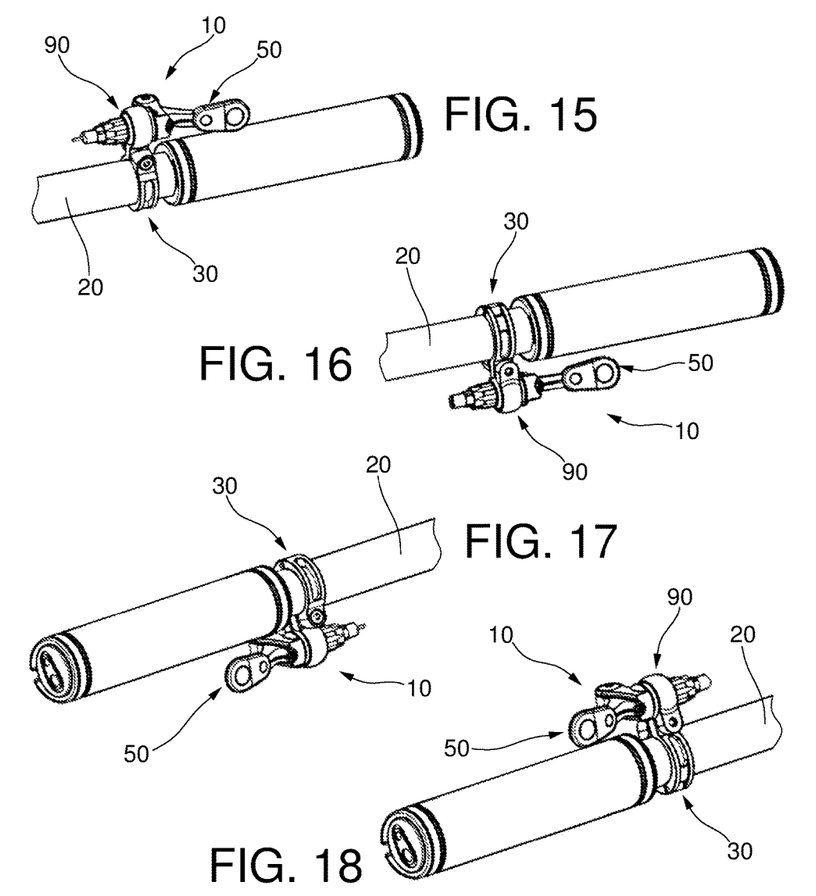
FIG. 15 is a perspective view of the lever assembly, mounted in top right position with respect to the bicycle handlebar.
FIG. 16 is a perspective view of the lever assembly, mounted in bottom right position with respect to the bicycle handlebar.
FIG. 17 is a perspective view of the lever assembly, mounted in bottom left position with respect to the bicycle handlebar.
FIG. 18 is a perspective view of the lever assembly, mounted in top left position with respect to the bicycle handlebar.

In particular, FIG. 15 shows the assembly 10 mounted in top right position with respect to the bicycle handlebar 20.

FIG. 16 shows the assembly 10 mounted in bottom right position with respect to the bicycle handlebar 20.

FIG. 17 shows the assembly 10 mounted in bottom left position with respect to the bicycle handlebar 20.

FIG. 18 shows the assembly 10 mounted in top left position with respect to the bicycle handlebar 20.

Figure 19:
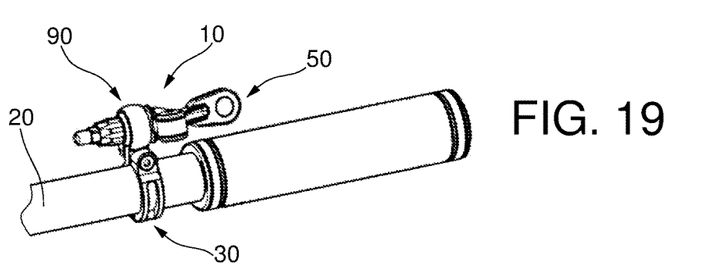
FIG. 19 is a perspective view of the lever assembly, mounted in top right position with respect to the bicycle handlebar, and in a finger pull orientation.

FIG. 19 shows the assembly 10 mounted in top right position with respect to the bicycle handlebar, and in a finger pull orientation.

It is noted that all mounting positions shown in FIGS. 15-19 can be achieved without disassembly of the lever support 40 from the coupling portion 30.

According to another advantage of the invention, the assembly 10 can fit both trigger and twist shifters, without being higher profile than necessary.

The assembly 10 according to the invention can be easily mounted on the handlebar while maintaining excellent access to the clamp fastener 100, and at the same time the actuation cable 120 exit doesn't interfere at all with shifters and brake levers.

More in general, the following assembly parameters can be now easily adjusted: distance between the handlebar and the lever, lever push angle, and lever swing orientation. The conversion between thumb push configuration to finger pull configuration can be easily and quickly achieved.

In other embodiments of the invention, not shown in the figures, coupling between the lever 50 and the lever support 40, instead of being of the hinged type, could be for example of the sliding type.

In a further embodiment of the invention, the assembly 10 can be operatively connected to a hydraulic actuation system, for example suitable for driving a height adjustable seat post or any other device.

In particular, at least the lever 50 is operatively connected to an hydraulic actuation system, and are designed to push and hydraulic fluid which drives a certain such an embodiment of the invention still retain the advantage of extensive position adjustability.

The present invention has been described according to preferred embodiments, but equivalent variants can be devised without departing from the scope of protection offered by the following claims.

The invention claimed is:

1. A remote control lever assembly for mounting on bicycle handlebars, comprising:
   a coupling portion for fixing the assembly to the bicycle handlebar;
   a lever support, and a lever movably connected to said lever support; and
   a spherical joint adjustably connecting said lever support to said coupling portion;
   said spherical joint comprising a spherical housing connected to said coupling portion, and a spherical protrusion of said lever support adjustably engaging said spherical housing; and
   wherein said lever support comprises a first passing channel of said spherical housing, through which an actuation cable passes.

2. The assembly according to claim 1, in which said coupling portion comprises a first clamp.

3. The assembly according to claim 2, comprising a second clamp, connected to said first clamp, in which said spherical housing is defined.

4. The assembly according to claim 3, comprising a clamp fastener to simultaneously fix said first clamp to said handlebar and said second clamp to said spherical protrusion.

5. The assembly according to claim 4, in which said clamp fastener comprises a clamp screw engaged in a common hole passing through said first clamp and said second clamp.

6. The assembly according to claim 4, in which said first clamp and said second clamp have respective openings substantially facing each other with respect to said clamp fastener.

7. The assembly according to claim 1, in which said lever is hinged to a lever body.

8. A remote control lever assembly for mounting on bicycle handlebars, comprising:
   a coupling portion for fixing the assembly to the bicycle handlebar;
   a lever support, and a lever movably connected to said lever support;
   an actuation cable, connected to said lever; and
   a spherical joint adjustably connecting said lever support to said coupling portion;
   wherein said spherical joint comprises a spherical housing connected to said coupling portion, and a spherical protrusion of said lever support engaging said spherical housing; and
   wherein said lever support comprises a first passing channel of said spherical housing, through which said actuation cable passes.

9. The assembly of claim 8, in which said lever comprises a second passing channel, through which said actuation cable passes.

10. The assembly of claim 9, in which said lever comprises a cable set screw to bend the end of said actuation cable towards the back of said lever.

11. The assembly of claim 10, in which said cable set screw is engaged in a threaded hole intercepting said second passing channel.

12. The assembly of claim 9, in which said lever comprises a recess in which said end of said actuation cable engages.

13. The assembly according to claim 12, in which said coupling portion comprises a first clamp, and in which said spherical housing is defined in a second clamp connected to said first clamp.

14. The assembly according to claim 13, comprising a clamp fastener suitable to simultaneously fix said first clamp to said handlebar and said second clamp to said spherical protrusion.

15. The assembly according to claim 14, in which said clamp fastener comprises a clamp screw engaged in a common hole passing through said first clamp and said second clamp.

* * * * *